(12) United States Patent
Bench et al.

(10) Patent No.: US 11,876,283 B1
(45) Date of Patent: Jan. 16, 2024

(54) COMBINED SATELLITE NAVIGATION AND RADIO TRANSCEIVER ANTENNA DEVICES

(71) Applicant: SeeScan, Inc., San Diego, CA (US)

(72) Inventors: Stephanie M. Bench, Sandersville, GA (US); Mark S. Olsson, La Jolla, CA (US)

(73) Assignee: SeeScan, Inc., San Diego, CA (US)

( * ) Notice: Subject to any disclaimer, the term of this patent is extended or adjusted under 35 U.S.C. 154(b) by 272 days.

(21) Appl. No.: 17/461,833

(22) Filed: Aug. 30, 2021

Related U.S. Application Data

(60) Provisional application No. 63/072,169, filed on Aug. 30, 2020.

(51) Int. Cl.
| | |
|---|---|
| *H01Q 1/24* | (2006.01) |
| *G01V 3/08* | (2006.01) |
| *G01S 19/36* | (2010.01) |
| *H01Q 1/52* | (2006.01) |
| *H01Q 1/22* | (2006.01) |
| *G01S 19/21* | (2010.01) |

(52) U.S. Cl.
CPC .............. *H01Q 1/24* (2013.01); *G01S 19/21* (2013.01); *G01S 19/36* (2013.01); *G01V 3/081* (2013.01); *H01Q 1/2283* (2013.01); *H01Q 1/2291* (2013.01); *H01Q 1/52* (2013.01)

(58) Field of Classification Search
CPC ...... H01Q 1/24; H01Q 1/2283; H01Q 1/2291; H01Q 1/52; G01S 19/21; G01S 19/36; G01V 3/081
USPC ........................................ 324/345, 323, 348
See application file for complete search history.

(56) References Cited

U.S. PATENT DOCUMENTS

| | | | |
|---|---|---|---|
| 11,101,543 B2 * | 8/2021 | Shinkawa | ................ H01Q 3/01 |
| 2018/0277928 A1 * | 9/2018 | Hartenstein | .............. H01Q 1/52 |
| 2023/0208036 A1 * | 6/2023 | Panther | ................ H01Q 9/0435 342/357.59 |

* cited by examiner

*Primary Examiner* — Giovanni Astacio-Oquendo
(74) *Attorney, Agent, or Firm* — Steven C. Tietsworth, Esq.; Michael J. Pennington, Esq.

(57) ABSTRACT

The present disclosure relates to combined antenna apparatus for receiving GNSS signals and other radio signals to mitigate cross-coupling.

21 Claims, 6 Drawing Sheets

COMBINED SATELLITE NAVIGATION AND RADIO TRANSCEIVER ANTENNA DEVICES

CROSS-REFERENCE TO RELATED APPLICATIONS

This application claims priority under 35 U.S.C. § 119(e) to U.S. Provisional Patent Application Ser. No. 63/072,169, entitled COMBINED SATELLITE NAVIGATION AND RADIO TRANSCEIVER ANTENNA DEVICES, filed on Aug. 30, 2020, the content of which is hereby incorporated by reference herein in its entirety for all purpose.

FIELD

This disclosure relates generally to combined satellite navigation radio transceiver antenna devices. More specifically, but not exclusively, this disclosure relates to combined satellite navigation and radio transceiver antenna devices for use in buried utility locators and utility locating and mapping systems.

BACKGROUND

There is a need in many modern devices to simultaneously receive and/or broadcast a multitude of different radio signals which may be at different frequencies. For instance, modern smart phones may generally receive and/or broadcast radio signals relating to global positioning systems (GPS) or other global navigation satellite systems (GNSS) as well as cell, WiFi, Bluetooth, and/or other radio transceiver signals. In such devices known in the art, simultaneously receiving and/or broadcasting different radio signals may generally be achieved through separate antennas or antenna systems for each radio. Shielding and/or signal filtering may be incorporated into some such devices to aid in preventing cross-coupling of signals.

Whereas such solutions to receiving and/or broadcasting different radio signals in a single device may be appropriate for some devices, there are a variety of circumstances wherein such solutions fail to be adequate in preventing cross-coupling of signals and/or are otherwise are suboptimal in antenna performance. For instance, in devices used to measure or sense electromagnetic signals, such as with magnetic buried utility locator devices, the signals at the signal sensing/measuring antennas and other radio antennas may interfere with one another and thus impact the performance of both the signal sensing/measuring antennas and the other radios. Such interference may be particular problematic in such devices configured to sense/measure signals across a large range of frequencies. In utility locator devices, for example, such interference may result in improperly located utility lines and ultimately risk costly damage to infrastructure and impact human safety. Likewise, such interference may negatively impact the performance of the other radios (e.g., GPS or other GNSS, Bluetooth, WiFi, or other like radio transceivers/receivers).

One strategy known in the art for preventing coupling of other radio signals at the sensing/measuring antennas of a utility locator device or similarly configured devices used to measure or sense electromagnetic signals may be to move the other radios (e.g., GPS or other GNSS, Bluetooth, WiFi, or other like radio transceivers/receivers) as far from the sensing/measuring antennas in the devices to the extent possible. In such solutions, the other radios may generally be positioned particularly close in proximity to one another and located at or near the opposite end of the device from the sensing/measuring antennas. Whereas such a solution may aid in preventing cross-coupling of signals at the sensing/measuring antennas, problems with cross-coupling of radio signals may be increased at the other radios (e.g., GPS or other GNSS, Bluetooth, WiFi, or like radio transceivers/receivers) now situated in close proximity to one another. In utility locator devices or like devices and associated systems that may configured to locate and map utility locations while simultaneously receiving satellite navigation signals and communicating between various other system devices via other radios. The impact of cross-coupling of signals may result in improperly located and mapped utility lines as well as failure to determine precise geographic locations and/or communicate or communicate effectively with other system devices and/or like problems related to simultaneously receiving and/or broadcasting different radio signals from radios in close proximity.

Accordingly, there is a need in the art to address these and other problems resulting from interference between receiving and/or broadcasting different radio signals in a single device. For example, there is a need in the art to address problems relating to cross-coupling of signals in utility locating devices and/or other devices for sensing/measuring electromagnetic signals, as well as other problems in the art resulting from antenna elements and associated receiving and transmitting devices that are positioned in close proximity or within single devices or systems.

SUMMARY

This disclosure relates generally to combined satellite navigation radio transceiver antenna devices. More specifically, but not exclusively, this disclosure relates to combined satellite navigation and radio transceiver antenna devices for use in buried utility locators and utility locating and mapping systems.

For example, in one aspect, the disclosure relates to a combined satellite navigation radio transceiver antenna device. The combined satellite navigation radio transceiver antenna device may include a substantially cylindrical global navigation system sensor (GNSS) antenna element having a vertical axis positioned atop a substantially cylindrical separate radio transceiver antenna element having a vertical axis substantially collinear to the axis of the GNSS antenna element. The GNSS antenna element may be positioned atop the of radio transceiver antenna element orienting the GNSS antenna element towards the sky during normal usage. The diameter of radio transceiver antenna element positioned below the GNSS antenna element may substantially match the diameter of the GNSS antenna element. Further the radio transceiver antenna element may have a height measuring less than two times the height of the GNSS antenna element. The antenna elements may be modular allowing for exchanging out of antenna elements and/or utilization of commercially available antennas. A waveguide element may control the radiation pattern of transmitted signals from the radio transceiver element. A spacing element or elements disposed between the radio transceiver antenna element and GNSS antenna element and the radio transceiver antenna element and other electronic elements that may be present in a device and/or system containing the combined satellite navigation radio transceiver antenna device. The combined satellite navigation radio transceiver antenna device may further include a shielding element disposed on the side of the spacing element(s) opposite that the radio transceiver antenna element. Additionally, connectors may separately couple to each antenna element such that each antenna element may communicate associated signal(s) to separate radio devices.

In another aspect, the disclosure relates to a combined satellite navigation radio transceiver antenna device. The device may include, for example, one or more of: a substantially cylindrical global navigation system sensor (GNSS) antenna element having a vertical axis, a substantially cylindrical radio transceiver antenna element positioned below the GNSS antenna element when in an upright vertical orientation, wherein the diameter of the radio transceiver antenna element may be substantially the same as the diameter of the GNSS antenna element, the vertical axes of the two antenna elements may be substantially collinear, and the height of the radio transceiver antenna element may be less than about twice the height of the GNSS antenna element. The device may further include one or more spacing elements disposed between the radio transceiver antenna element and GNSS antenna element, and between the radio transceiver antenna element and one or more other electronic elements in an electronic device or system operatively coupled to the combined satellite navigation radio transceiver antenna device, a shielding element disposed on the side of the spacing element or elements opposite the radio transceiver antenna element, and connectors separately coupling to each of the antenna elements such that each antenna element may be operatively coupled to an associated signal or signals provided to separate radio devices of the electronic device or system.

In another aspect the disclosure relates to a buried utility locator system for detecting hidden or buried utilities or other conductors. The system may include, for example, one or more of a magnetic sensing buried utility locator for receiving and processing AC magnetic field signals from a hidden or buried utility and determining information about the buried utility therefrom, a cylindrical global navigation system sensor (GNSS) antenna element, which may be substantially cylindrical, having a vertical axis, a radio transceiver antenna element, which may be substantially cylindrical, which may be positioned below the GNSS antenna element when in an upright vertical orientation, wherein the diameter of the radio transceiver antenna element may be substantially the same as the diameter of the GNSS antenna element, the vertical axes of the two antenna elements may be substantially collinear, and the height of the radio transceiver antenna element may be less than about twice the height of the GNSS antenna element. The system may further include a waveguide element configured to control the radiation pattern of signals transmitted from the antenna elements, one or more spacing elements disposed between the radio transceiver antenna element and GNSS antenna element and between the radio transceiver antenna element and one or more other electronic elements in an electronic device or system operatively coupled to the combined satellite navigation radio transceiver antenna device, a shielding element disposed on the side of the spacing element or elements opposite that the radio transceiver antenna element, connectors separately coupling to each of the antenna elements such that each antenna element is operatively coupled to an associated signal or signals provided to separate radio devices of the electronic device or system, one or more GNSS receiver modules operatively coupled to the GNSS antenna element, and electronics to receive and associate the information about the buried utility and positioning information from the GNS receiver module and store the information in a non-transitory memory.

In another aspect the disclosure relates to a combined satellite navigation radio transceiver antenna device. The device may include, for example, one or more of a global navigation system sensor (GNSS) antenna element having a vertical axis and a radio transceiver antenna element positioned above or below the GNSS antenna element when in an upright vertical orientation. The vertical axes of the two antenna elements are substantially collinear, the height of the radio transceiver antenna element may be less than twice the height of the GNSS antenna element. The device may further include a waveguide element configured to control the radiation pattern signals transmitted from the antenna elements, one or more spacing elements disposed between the radio transceiver antenna element and GNSS antenna element and between the radio transceiver antenna element and one or more other electronic elements in an electronic device or system operatively coupled to the combined satellite navigation radio transceiver antenna device, a shielding element disposed on the side of the spacing element or elements opposite that the radio transceiver antenna element, and connectors separately coupling to each of the antenna elements such that each antenna element is operatively coupled to an associated signal or signals provided to separate radio devices of the electronic device or system.

Various additional aspects, features, and functionality are further described below in conjunction with the appended Drawings.

BRIEF DESCRIPTION OF THE DRAWINGS

The present disclosure may be more fully appreciated in connection with the following detailed description taken in conjunction with the accompanying drawings, wherein.

DETAILED DESCRIPTION OF EMBODIMENTS

Overview

The present disclosure relates generally to combined satellite navigation radio transceiver antenna devices. More specifically, but not exclusively, this disclosure relates to combined satellite navigation and radio transceiver antenna devices for use in buried utility locators and utility locating and mapping systems.

For example, in one aspect, the disclosure relates to a combined satellite navigation radio transceiver antenna device. The combined satellite navigation radio transceiver antenna device may include a substantially cylindrical global navigation system sensor (GNSS) antenna element having a vertical axis and a substantially cylindrical separate radio transceiver antenna element having a vertical axis substantially collinear to the axis of the GNSS antenna element. The GNSS antenna element may be positioned atop the of radio transceiver antenna element orienting the GNSS antenna element towards the sky during normal usage. The diameter of radio transceiver antenna element positioned below the GNSS antenna element may substantially match the diameter of the GNSS antenna element. Further the radio transceiver antenna element may have a height measuring less than two times the height of the GNSS antenna element. The radio transceiver antenna element may include, but should not be limited to, Bluetooth and/or WiFi or other wireless local area network (WLAN) radios. A waveguide element may control the radiation pattern of transmitted signals from the radio transceiver element. The radio transceiver antenna element and/or waveguide element may be disposed on a PCB. The PCB may further include one or more GNSS receiver modules and/or other radio transceiver modules (e.g., Bluetooth, WiFi, WLAN, or like radio transceiver modules). In some embodiments, the GNSS receiver modules or modules may cover a frequency range spanning the lower L-band and upper L-band GNSS navigational frequencies. A spacing element or elements disposed between the radio transceiver antenna element and GNSS antenna element and the radio transceiver antenna element and other electronic elements that may be present in a device or system containing the combined satellite navigation radio transceiver antenna device. The combined satellite navigation radio transceiver antenna device may further include a shielding element disposed on the side of the spacing element(s) opposite that the radio transceiver antenna element. Additionally, connectors may separately couple to each antenna element such that each antenna element may communicate associated signal(s) to separate radio devices. In some embodiments, a combined satellite navigation radio transceiver antenna device may include a hollow cylindrical connector cover comprising of ferrite or like ferromagnetic materials that may be positioned to encapsulate the portion of the connectors passing through the combined satellite navigation radio transceiver antenna device towards the device employing the combined satellite navigation radio transceiver antenna device.

In another aspect, a combined satellite navigation radio transceiver antenna device in keeping with the present disclosure may be used in one or more devices used in utility locating systems including but not limited to utility locator devices.

In another aspect, the disclosure relates to a combined satellite navigation radio transceiver antenna device. The device may include, for example, one or more of: a substantially cylindrical global navigation system sensor (GNSS) antenna element having a vertical axis, a substantially cylindrical radio transceiver antenna element positioned below the GNSS antenna element when in an upright vertical orientation, wherein the diameter of the radio transceiver antenna element may be substantially the same as the diameter of the GNSS antenna element, the vertical axes of the two antenna elements may be substantially collinear, and the height of the radio transceiver antenna element may be less than about twice the height of the GNSS antenna element. The device may further include one or more spacing elements disposed between the radio transceiver antenna element and GNSS antenna element, and between the radio transceiver antenna element and one or more other electronic elements in an electronic device or system operatively coupled to the combined satellite navigation radio transceiver antenna device, a shielding element disposed on the side of the spacing element or elements opposite the radio transceiver antenna element, and connectors separately coupling to each of the antenna elements such that each antenna element may be operatively coupled to an associated signal or signals provided to separate radio devices of the electronic device or system.

The device may include, for example, a waveguide element configured to control the radiation pattern of signals transmitted from the antenna elements. The waveguide element may be disposed on a PCB. The radio transceiver antenna element may also be disposed on a PCB. The radio transceiver antenna element may be configured to receive and/or broadcast WiFi or other wireless local area networking (WLAN) signals. The radio transceiver antenna element may be configured to receive and/or broadcast Bluetooth signals. The radio transceiver antenna element may be further configured to receive and/or broadcast WiFi or other WLAN signals.

The device may include, for example, one or more GNSS receiver modules operatively coupled to the GNSS antenna element. The GNSS receiver module or modules may provide positioning output data from one or more outputs. The GNSS receiver modules may be configured to operate in a frequency range spanning the lower L-band and upper L-band GNSS navigational frequencies.

The device may include, for example, one or more hollow cylindrical connector covers comprised of ferrite or similar ferromagnetic materials encapsulating a portion of the one or more connectors disposed on one or more of the antenna devices. One or more of the antenna elements may be configured to be modular and detachable to allow for field interchange of antenna elements.

In another aspect the disclosure relates to a buried utility locator system for detecting hidden or buried utilities or other conductors. The system may include, for example, one or more of a magnetic sensing buried utility locator for receiving and processing AC magnetic field signals from a hidden or buried utility and determining information about the buried utility therefrom, a cylindrical global navigation system sensor (GNSS) antenna element, which may be substantially cylindrical, having a vertical axis, a radio transceiver antenna element, which may be substantially cylindrical, which may be positioned below the GNSS antenna element when in an upright vertical orientation, wherein the diameter of the radio transceiver antenna element may be substantially the same as the diameter of the GNSS antenna element, the vertical axes of the two antenna elements may be substantially collinear, and the height of the radio transceiver antenna element may be less than about twice the height of the GNSS antenna element. The system may further include a waveguide element configured to control the radiation pattern of signals transmitted from the antenna elements, one or more spacing elements disposed between the radio transceiver antenna element and GNSS antenna element and between the radio transceiver antenna element and one or more other electronic elements in an electronic device or system operatively coupled to the combined satellite navigation radio transceiver antenna device, a shielding element disposed on the side of the spacing element or elements opposite that the radio transceiver antenna element, connectors separately coupling to each of the antenna elements such that each antenna element is operatively coupled to an associated signal or signals provided to separate radio devices of the electronic device or system, one or more GNSS receiver modules operatively coupled to the GNSS antenna element, and electronics to receive and associate the information about the buried utility and positioning information from the GNS receiver module and store the information in a non-transitory memory.

The waveguide element and/or the radio transceiver elements may, for example, be disposed on a PCB. The radio transceiver antenna element may be configured to receive and/or broadcast WiFi or other wireless local area networking (WLAN) signals. The radio transceiver antenna element may be configured to receive and/or broadcast Bluetooth signals. The GNSS receiver modules may be configured to operate in a frequency range spanning the lower L-band and upper L-band GNSS navigational frequencies.

The system may further include, for example, one or more hollow cylindrical connector covers comprised of ferrite or similar ferromagnetic materials encapsulating a portion of the one or more connectors disposed in the antenna device. The antenna elements may be configured to be modular and detachable to allow for field interchange of antenna elements.

In another aspect the disclosure relates to a combined satellite navigation radio transceiver antenna device. The device may include, for example, one or more of a global navigation system sensor (GNSS) antenna element having a vertical axis and a radio transceiver antenna element positioned above or below the GNSS antenna element when in an upright vertical orientation. The vertical axes of the two antenna elements are substantially collinear, the height of the radio transceiver antenna element may be less than twice the height of the GNSS antenna element. The device may further include a waveguide element configured to control the radiation pattern signals transmitted from the antenna elements, one or more spacing elements disposed between the radio transceiver antenna element and GNSS antenna element and between the radio transceiver antenna element and one or more other electronic elements in an electronic device or system operatively coupled to the combined satellite navigation radio transceiver antenna device, a shielding element disposed on the side of the spacing element or elements opposite that the radio transceiver antenna element, and connectors separately coupling to each of the antenna elements such that each antenna element is operatively coupled to an associated signal or signals provided to separate radio devices of the electronic device or system.

Various additional aspects, features, and functionality are further described below in conjunction with the appended Drawings.

Various embodiments of the disclosures herein may be implemented on or in conjunction with electronic test or measurement equipment, such as buried utility locators and associated devices, surveying equipment, devices, and systems, mapping equipment, devices, and systems, as well as various other electronics and test and measurement devices and systems.

In an exemplary embodiment the disclosures herein may be implemented with a buried utility locator, also denoted herein as a utility locator or simply a locator. Details of example utility locator embodiments and associated utility locating systems and devices that may include or be used in conjunction with the various antenna device and system embodiments herein are disclosed in co-assigned patents and patent applications including, for example: U.S. Pat. No. 7,009,399, issued Mar. 7, 2006, entitled OMNIDIRECTIONAL SONDE AND LINE LOCATOR; U.S. Pat. No. 7,136,765, issued Nov. 14, 2006, entitled A BURIED OBJECT LOCATING AND TRACING METHOD AND SYSTEM EMPLOYING PRINCIPAL COMPONENTS ANALYSIS FOR BLIND SIGNAL DETECTION; U.S. Pat. No. 7,221,136, issued May 22, 2007, entitled SONDES FOR LOCATING UNDERGROUND PIPES AND CONDUITS; U.S. Pat. No. 7,276,910, issued Oct. 2, 2007, entitled A COMPACT SELF-TUNED ELECTRICAL RESONATOR FOR BURIED OBJECT LOCATOR APPLICATIONS; U.S. Pat. No. 7,288,929, issued Oct. 30, 2007, entitled INDUCTIVE CLAMP FOR APPLYING SIGNAL TO BURIED UTILITIES; U.S. Pat. No. 7,298,126, issued Nov. 20, 2007, entitled SONDES FOR LOCATING UNDERGROUND PIPES AND CONDUITS; U.S. Pat. No. 7,332,901, issued Feb. 19, 2008, entitled LOCATOR WITH APPARENT DEPTH INDICATION; U.S. Pat. No. 7,443,154, issued Oct. 28, 2008, entitled MULTI-SENSOR MAPPING OMNIDIRECTIONAL SONDE AND LINE LOCATOR; U.S. Pat. No. 7,498,797, issued Mar. 3, 2009, entitled LOCATOR WITH CURRENT-MEASURING CAPABILITY; U.S. Pat. No. 7,498,816, issued Mar. 3, 2009, entitled OMNIDIRECTIONAL SONDE AND LINE LOCATOR; U.S. Pat. No. 7,336,078, issued Feb. 26, 2008, entitled MULTI-SENSOR MAPPING OMNIDIRECTIONAL SONDE AND LINE LOCATORS; U.S. Pat. No. 7,518,374, issued Apr. 14, 2009, entitled RECONFIGURABLE PORTABLE LOCATOR EMPLOYING MULTIPLE SENSOR ARRAYS HAVING FLEXIBLE NESTED ORTHOGONAL ANTENNAS; U.S. Pat. No. 7,557,559, issued Jul. 7, 2009, entitled COMPACT LINE ILLUMINATOR FOR BURIED PIPES AND CABLES; U.S. Pat. No. 7,619,516, issued Nov. 17, 2009, entitled SINGLE AND MULTI-TRACE OMNIDIRECTIONAL SONDE AND LINE LOCATORS AND TRANSMITTER USED THEREWITH; U.S. Pat. No. 7,619,516, issued Nov. 17, 2009, entitled SINGLE AND MULTI-TRACE OMNIDIRECTIONAL SONDE AND LINE LOCATORS AND TRANSMITTER USED THEREWITH; U.S. Pat. No. 7,733,077, issued Jun. 8, 2010, entitled MULTI-SENSOR MAPPING OMNIDIRECTIONAL SONDE AND LINE LOCATORS AND TRANSMITTER USED THEREWITH; U.S. Pat. No. 7,741,848, issued Jun. 22, 2010, entitled ADAPTIVE MULTICHANNEL LOCATOR SYSTEM FOR MULTIPLE PROXIMITY DETECTION; U.S. Pat. No. 7,755,360, issued Jul. 13, 2010, entitled PORTABLE LOCATOR SYSTEM WITH JAMMING REDUCTION; U.S. Pat. No. 7,825,647, issued Nov. 2, 2010, entitled METHOD FOR LOCATING BURIED PIPES AND CABLES; U.S. Pat. No. 7,830,149, issued Nov. 9, 2010, entitled AN UNDERGROUND UTILITY LOCATOR WITH A TRANSMITTER, A PAIR OF UPWARDLY OPENING POCKET AND HELICAL COIL TYPE ELECTRICAL CORDS; U.S. Pat. No. 7,864,980, issued Jan. 4, 2011, entitled SONDES FOR LOCATING UNDERGROUND PIPES AND CONDUITS; U.S. Pat. No. 7,948,236, issued May 24, 2011, entitled ADAPTIVE MULTI-CHANNEL LOCATOR SYSTEM FOR MULTIPLE PROXIMITY DETECTION; U.S. Pat. No. 7,969,151, issued Jun. 28, 2011, entitled PREAMPLIFIER AND MIXER CIRCUITRY FOR A LOCATOR ANTENNA; U.S. Pat. No. 7,990,151, issued Aug. 2, 2011, entitled TRI-POD BURIED LOCATOR SYSTEM; U.S. Pat. No. 8,013,610, issued Sep. 6, 2011, entitled HIGH Q SELF-TUNING LOCATING TRANSMITTER; U.S. Pat. No. 8,035,390, issued Oct. 11, 2011, entitled OMNIDIRECTIONAL SONDE AND LINE LOCATOR; U.S. Pat. No. 8,106,660, issued Jan. 31, 2012, entitled SONDE ARRAY FOR USE WITH BURIED LINE LOCATOR; U.S. Pat. No. 8,203,343, issued Jun. 19, 2012, entitled RECONFIGURABLE PORTABLE LOCATOR EMPLOYING MULTIPLE SENSOR ARRAYS HAVING FLEXIBLE NESTED ORTHOGONAL ANTENNAS; U.S. Pat. No. 8,264,226, issued Sep. 11, 2012, entitled SYSTEM AND METHOD FOR LOCATING BURIED PIPES AND CABLES WITH A MAN PORTABLE LOCATOR AND A TRANSMITTER IN A MESH NETWORK; U.S. Pat. No. 8,248,056, issued Aug. 21, 2012, entitled A BURIED OBJECT LOCATOR SYSTEM EMPLOYING AUTOMATED VIRTUAL DEPTH EVENT DETECTION AND SIGNALING; U.S. patent application Ser. No. 13/769,202, filed Feb. 15, 2013, entitled SMART PAINT STICK DEVICES AND METHODS; U.S. patent application Ser. No. 13/793,168, filed Mar. 11, 2013, entitled BURIED OBJECT LOCATORS WITH CONDUCTIVE ANTENNA BOBBINS; U.S. Pat. No. 8,400,154, issued Mar. 19, 2013, entitled LOCATOR ANTENNA WITH CONDUCTIVE BOBBIN; U.S. patent application Ser. No. 14/027,027, filed Sep. 13, 2013, entitled SONDE DEVICES INCLUDING A SECTIONAL FERRITE CORE STRUCTURE; U.S. patent application Ser. No. 14/033,349, filed Sep. 20, 2013, entitled AN UNDERGROUND UTILITY LOCATOR WITH A TRANSMITTER, A PAIR OF UPWARDLY OPENING POCKET AND HELICAL COIL TYPE ELECTRICAL CORDS; U.S. Pat. No. 8,547,428, issued Oct. 1, 2013, entitled PIPE MAPPING SYSTEM; U.S. Pat. No. 8,564,295, issued Oct. 22, 2013, entitled METHOD FOR SIMULTANEOUSLY DETERMINING A PLURALITY OF DIFFERENT LOCATIONS OF THE BURIED OBJECTS AND SIMULTANEOUSLY INDICATING THE DIFFERENT LOCATIONS TO A USER; U.S. patent application Ser. No. 14/148,649, filed Jan. 6, 2014, entitled MAPPING LOCATING SYSTEMS & METHODS; U.S. Pat. No. 8,635,043, issued Jan. 21, 2014, entitled LOCATOR AND TRANSMITTER CALIBRATION SYSTEM; U.S. Pat. No. 8,717,028, issued May 6, 2014, entitled SPRING CLIPS FOR USE WITH LOCATING TRANSMITTERS; U.S. Pat. No. 8,773,133, issued Jul. 8, 2014, entitled ADAPTIVE MULTICHANNEL LOCATOR SYSTEM FOR MULTIPLE PROXIMITY DETECTION; U.S. Pat. No. 8,841,912, issued Sep. 23, 2014, entitled PREAMPLIFIER AND MIXER CIRCUITRY FOR A LOCATOR ANTENNA; U.S. Pat. No. 9,041,794, issued May 26, 2015, entitled PIPE MAPPING SYSTEMS AND METHODS; U.S. Pat. No. 9,057,754, issued Jun. 16, 2015, entitled ECONOMICAL MAGNETIC LOCATOR APPARATUS AND METHOD; U.S. Pat. No. 9,081,109, issued Jul. 14, 2015, entitled GROUND-TRACKING DEVICES FOR USE WITH A MAPPING LOCATOR; U.S. Pat. No. 9,082,269, issued Jul. 14, 2015, entitled HAPTIC DIRECTIONAL FEEDBACK HANDLES FOR LOCATION DEVICES; U.S. Pat. No. 9,085,007, issued Jul. 21, 2015, entitled MARKING PAINT APPLICATOR FOR PORTABLE LOCATOR; U.S. Pat. No. 9,207,350, issued Dec. 8, 2015, entitled BURIED OBJECT LOCATOR APPARATUS WITH SAFETY LIGHTING ARRAY; U.S. Pat. No. 9,341,740, issued May 17, 2016, entitled OPTICAL GROUND TRACKING APPARATUS, SYSTEMS, AND METHODS; U.S. Pat. No. 9,372,117, issued Jun. 21, 2016, entitled OPTICAL GROUND TRACKING APPARATUS, SYSTEMS, AND METHODS; U.S. patent application Ser. No. 15/187,785, filed Jun. 21, 2016, entitled BURIED UTILITY LOCATOR GROUND TRACKING APPARATUS, SYSTEMS, AND METHODS; U.S. Pat. No. 9,411,066, issued Aug. 9, 2016, entitled SONDES & METHODS FOR USE WITH BURIED LINE LOCATOR SYSTEMS; U.S. Pat. No. 9,411,067, issued Aug. 9, 2016, entitled GROUND-TRACKING SYSTEMS AND APPARATUS; U.S. Pat. No. 9,435,907, issued Sep. 6, 2016, entitled PHASE SYNCHRONIZED BURIED OBJECT LOCATOR APPARATUS, SYSTEMS, AND METHODS; U.S. Pat. No. 9,465,129, issued Oct. 11, 2016, entitled IMAGE-BASED MAPPING LOCATING SYSTEM; U.S. Pat. No. 9,488,747, issued Nov. 8, 2016, entitled GRADIENT ANTENNA COILS AND ARRAYS FOR USE IN LOCATING SYSTEM; U.S. Pat. No. 9,494,706, issued Nov. 15, 2016, entitled OMNI-INDUCER TRANSMITTING DEVICES AND METHODS; U.S. Pat. No. 9,523,788, issued Dec. 20, 2016, entitled MAGNETIC SENSING BURIED OBJECT LOCATOR INCLUDING A CAMERA; U.S. Pat. No. 9,571,326, issued Feb. 14, 2017, entitled METHOD AND APPARATUS FOR HIGH-SPEED DATA TRANSFER EMPLOYING SELF-SYNCHRONIZING QUADRATURE AMPLITUDE MODULATION (QAM); U.S. Pat. No. 9,599,449, issued Mar. 21, 2017, entitled SYSTEMS AND METHODS FOR LOCATING BURIED OR HIDDEN OBJECTS USING SHEET CURRENT FLOW MODELS; U.S. Pat. No. 9,599,740, issued Mar. 21, 2017, entitled USER INTERFACES FOR UTILITY LOCATORS; U.S. Pat. No. 9,625,602, issued Apr. 18, 2017, entitled SMART PERSONAL COMMUNICATION DEVICES AS USER INTERFACES; U.S. Pat. No. 9,632,202, issued Apr. 25, 2017, entitled ECONOMICAL MAGNETIC LOCATOR APPARATUS AND METHODS; U.S. Pat. No. 9,634,878, issued Apr. 25, 2017, entitled SYSTEMS AND METHODS FOR DATA TRANSFER USING SELF-SYNCHRONIZING QUADRATURE AMPLITUDE MODULATION (QAM); U.S. patent application Ser. No. 11/300,597, filed Apr. 25, 2017, entitled SYSTEMS AND METHODS FOR LOCATING AND/OR MAPPING BURIED UTILITIES USING VEHICLE-MOUNTED LOCATING DEVICES; U.S. Pat. No. 9,638,824, issued May 2, 2017, entitled QUAD-GRADIENT COILS FOR USE IN LOCATING SYSTEMS; U.S. patent application Ser. No. 15/590,964, filed May 9, 2017, entitled BORING INSPECTION SYSTEMS AND METHODS; U.S. Pat. No. 9,651,711, issued May 16, 2017, entitled HORIZONTAL BORING INSPECTION DEVICE AND METHODS; U.S. Pat. No. 9,684,090, issued Jun. 20, 2017, entitled NULLED-SIGNAL LOCATING DEVICES, SYSTEMS, AND METHODS; U.S. Pat. No. 9,696,447, issued Jul. 4, 2017, entitled BURIED OBJECT LOCATING METHODS AND APPARATUS USING MULTIPLE ELECTROMAGNETIC SIGNALS; U.S. Pat. No. 9,696,448, issued Jul. 4, 2017, entitled GROUND-TRACKING DEVICES AND METHODS FOR USE WITH A UTILITY LOCATOR; U.S. Pat. No. 9,703,002, issued Jun. 11, 2017, entitled UTILITY LOCATOR SYSTEMS & METHODS; U.S. patent application Ser. No. 15/670,845, filed Aug. 7, 2016, entitled HIGH FREQUENCY AC-POWERED DRAIN CLEANING AND INSPECTION APPARATUS & METHODS; U.S. patent application Ser. No. 15/681,250, filed Aug. 18, 2017, entitled ELECTRONIC MARKER DEVICES AND SYSTEMS; U.S. patent application Ser. No. 15/681,409, filed Aug. 20, 2017, entitled WIRELESS BURIED PIPE & CABLE LOCATING SYSTEMS; U.S. Pat. No. 9,746,572, issued Aug. 29, 2017, entitled ELECTRONIC MARKER DEVICES AND SYSTEMS; U.S. Pat. No. 9,746,573, issued Aug. 29, 2017, entitled WIRELESS BURIED PIPE AND CABLE LOCATING SYSTEMS; U.S. Pat. No. 9,784,837, issued Oct. 10, 2017, entitled OPTICAL GROUND TRACKING APPARATUS, SYSTEMS & METHODS; U.S. patent application Ser. No. 15/811,361, filed Nov. 13, 2017, entitled OPTICAL GROUND-TRACKING APPARATUS, SYSTEMS, AND METHODS; U.S. Pat. No. 9,841,503, issued Dec. 12, 2017, entitled OPTICAL GROUND-TRACKING APPARATUS, SYSTEMS, AND METHODS; U.S. patent application Ser. No. 15/846,102, filed Dec. 18, 2017, entitled SYSTEMS AND METHOD FOR ELECTRONICALLY MARKING, LOCATING AND VIRTUALLY DISPLAYING BURIED UTILITIES; U.S. patent application Ser. No. 15/866,360, filed Jan. 9, 2018, entitled TRACKED DISTANCE MEASURING DEVICES, SYSTEMS, AND METHODS; U.S. Pat. No. 9,891,337, issued Feb. 13, 2018, entitled UTILITY LOCATOR TRANSMITTER DEVICES, SYSTEMS, and METHODS WITH DOCKABLE APPARATUS; U.S. Pat. No. 9,914,157, issued Mar. 13, 2018, entitled METHODS AND APPARATUS FOR CLEARING OBSTRUCTIONS WITH A JETTER PUSH-CABLE APPARATUS; U.S. patent application Ser. No. 15/925,643, issued Mar. 19, 2018, entitled PHASE-SYNCHRONIZED BURIED OBJECT TRANSMITTER AND LOCATOR METHODS AND APPARATUS; U.S. patent application Ser. No. 15/925,671, issued Mar. 19, 2018, entitled MULTI-FREQUENCY LOCATING SYSTEMS AND METHODS; U.S. patent application Ser. No. 15/936,250, filed Mar. 26, 208, entitled GROUND TRACKING APPARATUS, SYSTEMS, AND METHODS; U.S. Pat. No. 9,927,545, issued Mar. 27, 2018, entitled MULTI-FREQUENCY LOCATING SYSTEMS & METHODS; U.S. Pat. No. 9,928,613, issued Mar. 27, 2018, entitled GROUND TRACKING APPARATUS, SYSTEMS, AND METHODS; U.S. patent application Ser. No. 15/250,666, filed Mar. 27, 2018, entitled PHASE-SYNCHRONIZED BURIED OBJECT TRANSMITTER AND LOCATOR METHODS AND APPARATUS; U.S. Pat. No. 9,880,309, issued Mar. 28, 2018, entitled UTILITY LOCATOR TRANSMITTER APPARATUS & METHODS; U.S. patent application Ser. No. 15/954,486, filed Apr. 16, 2018, entitled UTILITY LOCATOR APPARATUS, SYSTEMS, AND METHODS; U.S. Pat. No. 9,945,976, issued Apr. 17, 2018, entitled UTILITY LOCATOR APPARATUS, SYSTEMS, AND METHODS; U.S. Pat. No. 9,989,662, issued Jun. 5, 2018, entitled BURIED OBJECT LOCATING DEVICE WITH A PLURALITY OF SPHERICAL SENSOR BALLS THAT INCLUDE A PLURALITY OF ORTHOGONAL ANTENNAE; U.S. patent application Ser. No. 16/036,713, issued Jul. 16, 2018, entitled UTILITY LOCATOR APPARATUS AND SYSTEMS; U.S. Pat. No. 10,024,994, issued Jul. 17, 2018, entitled WEARABLE MAGNETIC FIELD UTILITY LOCATOR SYSTEM WITH SOUND FIELD GENERATION; U.S. Pat. No. 10,031,253, issued Jul. 24, 2018, entitled GRADIENT ANTENNA COILS AND ARRAYS FOR USE IN LOCATING SYSTEMS; U.S. Pat. No. 10,042,072, issued Aug. 7, 2018, entitled OMNI-INDUCER TRANSMITTING DEVICES AND METHODS; U.S. Pat. No. 10,059,504, issued Aug. 28, 2018, entitled MARKING PAINT APPLICATOR FOR USE WITH PORTABLE UTILITY LOCATOR; U.S. patent application Ser. No. 16/049,699, filed Jul. 30, 2018, entitled OMNI-INDUCER TRANSMITTING DEVICES AND METHODS; U.S. Pat. No. 10,069,667, issued Sep. 4, 2018, entitled SYSTEMS AND METHODS FOR DATA TRANSFER USING SELF-SYNCHRONIZING QUADRATURE AMPLITUDE MODULATION (QAM); U.S. patent application Ser. No. 16/121,379, filed Sep. 4, 2018, entitled KEYED CURRENT SIGNAL UTILITY LOCATING SYSTEMS AND METHODS; U.S. patent application Ser. No. 16/125,768, filed Sep. 10, 2018, entitled BURIED OBJECT LOCATOR APPARATUS AND METHODS; U.S. Pat. No. 10,073,186, issued Sep. 11, 2018, entitled KEYED CURRENT SIGNAL UTILITY LOCATING SYSTEMS AND METHODS; U.S. patent application Ser. No. 16/133,642, issued Sep. 17, 2018, entitled MAGNETIC UTILITY LOCATOR DEVICES AND METHODS; U.S. Pat. No. 10,078,149, issued Sep. 18, 2018, entitled BURIED OBJECT LOCATORS WITH DODECAHEDRAL ANTENNA NODES; U.S. Pat. No. 10,082,591, issued Sep. 25, 2018, entitled MAGNETIC UTILITY LOCATOR DEVICES & METHODS; U.S. Pat. No. 10,082,599, issued Sep. 25, 2018, entitled MAGNETIC SENSING BURIED OBJECT LOCATOR INCLUDING A CAMERA; U.S. Pat. No. 10,090,498, issued Oct. 2, 2018, entitled MODULAR BATTERY PACK APPARATUS, SYSTEMS, AND METHODS INCLUDING VIRAL DATA AND/OR CODE TRANSFER; U.S. patent application Ser. No. 16/160,874, filed Oct. 15, 2018, entitled TRACKABLE DIPOLE DEVICES, METHODS, AND SYSTEMS FOR USE WITH MARKING PAINT STICKS; U.S. patent application Ser. No. 16/222,994, filed Dec. 17, 2018, entitled UTILITY LOCATORS WITH RETRACTABLE SUPPORT STRUCTURES AND APPLICATIONS THEREOF; U.S. Pat. No. 10,105,723, issued Oct. 23, 2018, entitled TRACKABLE DIPOLE DEVICES, METHODS, AND SYSTEMS FOR USE WITH MARKING PAINT STICKS; U.S. Pat. No. 10,162,074, issued Dec. 25, 2018, entitled UTILITY LOCATORS WITH RETRACTABLE SUPPORT STRUCTURES AND APPLICATIONS THEREOF; U.S. patent application Ser. No. 16/241,864, filed Jan. 7, 2019, entitled TRACKED DISTANCE MEASURING DEVICES, SYSTEMS, AND METHODS; U.S. patent application Ser. No. 16/255,524, filed Jan. 23, 2019, entitled RECHARGEABLE BATTERY PACK ONBOARD CHARGE STATE INDICATION METHODS AND APPARATUS; U.S. Pat. No. 10,247,845, issued Apr. 2, 2019, entitled UTILITY LOCATOR TRANSMITTER APPARATUS AND METHODS; U.S. patent application Ser. No. 16/382,136, filed Apr. 11, 2019, entitled GEOGRAPHIC MAP UPDATING METHODS AND SYSTEMS; U.S. Pat. No. 10,274,632, issued Apr. 20, 2019, entitled UTILITY LOCATING SYSTEMS WITH MOBILE BASE STATION; U.S. patent application Ser. No. 16/390,967, filed Apr. 22, 2019, entitled UTILITY LOCATING SYSTEMS WITH MOBILE BASE STATION; U.S. patent application Ser. No. 29/692,937, filed May 29, 2019, entitled BURIED OBJECT LOCATOR; U.S. patent application Ser. No. 16/436,903, filed Jun. 10, 2019, entitled OPTICAL GROUND TRACKING APPARATUS, SYSTEMS, AND METHODS FOR USE WITH BURIED UTILITY LOCATORS; U.S. Pat. No. 10,317,559, issued Jun. 11, 2019, entitled GROUND-TRACKING DEVICES AND METHODS FOR USE WITH A UTILITY LOCATOR; U.S. patent application Ser. No. 16/449,187, filed Jun. 21, 2019, entitled ELECTROMAGNETIC MARKER DEVICES FOR BURIED OR HIDDEN USE; U.S. patent application Ser. No. 16/455,491, filed Jun. 27, 2019, entitled SELF-STANDING MULTI-LEG ATTACHMENT DEVICES FOR USE WITH UTILITY LOCATORS; U.S. Pat. No. 10,353,103, issued Jul. 16, 2019, entitled SELF-STANDING MULTI-LEG ATTACHMENT DEVICES FOR USE WITH UTILITY LOCATORS; U.S. patent application Ser. No. 16/551,653, filed Aug. 26, 2019, entitled BURIED UTILITY MARKER DEVICES, SYSTEMS, AND METHODS; U.S. Pat. No. 10,401,526, issued Sep. 3, 2019, entitled BURIED UTILITY MARKER DEVICES, SYSTEMS, AND METHODS; U.S. Pat. No. 10,324,188, issued Oct. 9, 2019, entitled OPTICAL GROUND TRACKING APPARATUS, SYSTEMS, AND METHODS FOR USE WITH BURIED UTILITY LOCATORS; U.S. patent application Ser. No. 16/446,456, filed Jun. 19, 2019, entitled DOCKABLE TRIPODAL CAMERA CONTROL UNIT; U.S. patent application Ser. No. 16/520,248, filed Jul. 23, 2019, entitled MODULAR BATTERY PACK APPARATUS, SYSTEMS, AND METHODS; U.S. Pat. No. 10,371,305, issued Aug. 6, 2019, entitled DOCKABLE TRIPODAL CAMERA CONTROL UNIT; U.S. Pat. No. 10,490,908, issued Nov. 26, 2019, entitled DUAL ANTENNA SYSTEMS WITH VARIABLE POLARIZATION; U.S. patent application Ser. No. 16/701,085, filed Dec. 2, 2019, entitled MAP GENERATION BASED ON UTILITY LINE POSITION AND ORIENTATION ESTIMATES; U.S. Pat. No. 10,534,105, issued Jan. 14, 2020, entitled UTILITY LOCATING TRANSMITTER APPARATUS AND METHODS; U.S. patent application Ser. No. 16/773,952, filed Jan. 27, 2020, entitled MAGNETIC FIELD CANCELING AUDIO DEVICES; U.S. patent application Ser. No. 16/780,813, filed Feb. 3, 2020, entitled RESILIENTLY DEFORMABLE MAGNETIC FIELD CORE APPARATUS AND APPLICATIONS; U.S. Pat. No. 10,555,086, issued Feb. 4, 2020, entitled MAGNETIC FIELD CANCELING AUDIO SPEAKERS FOR USE WITH BURIED UTILITY LOCATORS OR OTHER DEVICES; U.S. patent application Ser. No. 16/786,935, filed Feb. 10, 2020, entitled SYSTEMS AND METHODS FOR UNIQUELY IDENTIFYING BURIED UTILITIES IN A MULTI-UTILITY ENVIRONMENT; U.S. Pat. No. 10,557,824, issued Feb. 11, 2020, entitled RESILIENTLY DEFORMABLE MAGNETIC FIELD TRANSMITTER CORES FOR USE WITH UTILITY LOCATING DEVICES AND SYSTEMS; U.S. patent application Ser. No. 16/791,979, issued Feb. 14, 2020, entitled MARKING PAINT APPLICATOR APPARATUS; U.S. patent application Ser. No. 16/792,047, filed Feb. 14, 2020, entitled SATELLITE AND MAGNETIC FIELD SONDE APPARATUS AND METHODS; U.S. Pat. No. 10,564,309, issued Feb. 18, 2020, entitled SYSTEMS AND METHODS FOR UNIQUELY IDENTIFYING BURIED UTILITIES IN A MULTI-UTILITY ENVIRONMENT; U.S. Pat. No. 10,571,594, issued Feb. 25, 2020, entitled UTILITY LOCATOR DEVICES, SYSTEMS, AND METHODS WITH SATELLITE AND MAGNETIC FIELD SONDE ANTENNA SYSTEMS; U.S. Pat. No. 10,569,952, issued Feb. 25, 2020, entitled MARKING PAINT APPLICATOR FOR USE WITH PORTABLE UTILITY LOCATOR; U.S. patent application Ser. No. 16/810,788, filed Mar. 5, 2019, entitled MAGNETICALLY RETAINED DEVICE HANDLES; U.S. patent application Ser. No. 16/827,672, filed Mar. 23, 2020, entitled DUAL ANTENNA SYSTEMS WITH VARIABLE POLARIZATION; U.S. patent application Ser. No. 16/833,426, filed Mar. 27, 2020, entitled LOW COST, HIGH PERFORMANCE SIGNAL PROCESSING IN A MAGNETIC-FIELD SENSING BURIED UTILITY LOCATOR SYSTEM; U.S. Pat. No. 10,608,348, issued Mar. 31, 2020, entitled DUAL ANTENNA SYSTEMS WITH VARIABLE POLARIZATION; U.S. patent application Ser. No. 16/837,923, filed Apr. 1, 2020, entitled MODULAR BATTERY PACK APPARATUS, SYSTEMS, AND METHODS INCLUDING VIRAL DATA AND/OR CODE TRANSFER; U.S. patent application Ser. No. 17/235,507, filed Apr. 20, 2021, entitled UTILITY LOCATING DEVICES EMPLOYING MULTIPLE SPACED APART GNSS ANTENNAS; U.S. Provisional Patent Application 63/015,692, filed Apr. 27, 2020, entitled SPATIALLY AND PROCESSING-BASED DIVERSE REDUNDANCY FOR RTK POSITIONING; U.S. patent application Ser. No. 16/872,362, filed May 11, 2020, entitled BURIED LOCATOR SYSTEMS AND METHODS; U.S. patent application Ser. No. 16/882,719, filed May 25, 2020, entitled UTILITY LOCATING SYSTEMS, DEVICES, AND METHODS USING RADIO BROADCAST SIGNALS; U.S. Pat. No. 10,670,766, issued Jun. 2, 2020, entitled UTILITY LOCATING SYSTEMS, DEVICES, AND METHODS USING RADIO BROADCAST SIGNALS; U.S. Pat. No. 10,677,820, issued Jun. 9, 2020, entitled BURIED LOCATOR SYSTEMS AND METHODS; U.S. patent application Ser. No. 16/902,245, filed Jun. 15, 2020, entitled LOCATING DEVICES, SYSTEMS, AND METHODS USING FREQUENCY SUITES FOR UTILITY DETECTION; U.S. patent application Ser. No. 16/902,249, filed Jun. 15, 2020, entitled USER INTERFACES FOR UTILITY LOCATORS; U.S. Pat. No. 10,690,795, issued Jun. 23, 2020, entitled LOCATING DEVICES, SYSTEMS, AND METHODS USING FREQUENCY SUITES FOR UTILITY DETECTION; U.S. patent application Ser. No. 16/908,625, filed Jun. 22, 2020, entitled ELECTROMAGNETIC MARKER DEVICES WITH SEPARATE RECEIVE AND TRANSMIT ANTENNA ELEMENTS; U.S. Pat. No. 10,690,796, issued Jun. 23, 2020, entitled USER INTERFACES FOR UTILITY LOCATORS; U.S. patent application Ser. No. 16/921,775, filed Jul. 6, 2020, entitled AUTO-TUNING CIRCUIT APPARATUS AND METHODS; U.S. Provisional Patent Application 63/055,278, filed Jul. 22, 2020, entitled VEHICLE-BASED UTILITY LOCATING USING PRINCIPAL COMPONENTS; U.S. patent application Ser. No. 16/995,801, filed Aug. 17, 2020, entitled UTILITY LOCATOR TRANSMITTER DEVICES, SYSTEMS, AND METHODS; U.S. patent application Ser. No. 17/001,200, filed Aug. 24, 2020, entitled MAGNETIC SENSING BURIED UTILITY LOCATOR INCLUDING A CAMERA; U.S. patent Ser. No. 16/995,793, filed Aug. 17, 2020, entitled UTILITY LOCATOR APPARATUS AND METHODS; U.S. Pat. No. 10,753,722, issued Aug. 25, 2020, entitled SYSTEMS AND METHODS FOR LOCATING BURIED OR HIDDEN OBJECTS USING SHEET CURRENT FLOW MODELS; U.S. Pat. No. 10,754,053, issued Aug. 25, 2020, entitled UTILITY LOCATOR TRANSMITTER DEVICES, SYSTEMS, AND METHODS WITH DOCKABLE APPARATUS; U.S. Pat. No. 10,761,233, issued Sep. 1, 2020, entitled SONDES AND METHODS FOR USE WITH BURIED LINE LOCATOR SYSTEMS; U.S. Pat. No. 10,761,239, issued Sep. 1, 2020, entitled MAGNETIC SENSING BURIED UTILITY LOCATOR INCLUDING A CAMERA; U.S. patent application Ser. No. 17/013,831, filed Sep. 7, 2020, entitled MULTIFUNCTION BURIED UTILITY LOCATING CLIPS; U.S. Pat. No. 10,777,919, issued Sep. 15, 2020, entitled MULTIFUNCTION BURIED UTILITY LOCATING CLIPS; U.S. patent application Ser. No. 17/020,487, filed Sep. 14, 2020, entitled ANTENNA SYSTEMS FOR CIRCULARLY POLARIZED RADIO SIGNALS; U.S. patent application Ser. No. 17/068,156, filed Oct. 12, 2020, entitled DUAL SENSED LOCATING SYSTEMS AND METHODS; U.S. Provisional Patent Application 63/091,67, filed Oct. 14, 2020, entitled ELECTRONIC MARKER-BASED NAVIGATION SYSTEMS AND METHODS FOR USE IN GNSS-DEPRIVED ENVIRONMENTS; U.S. Pat. No. 10,809,408, issued Oct. 20, 2020, entitled DUAL SENSED LOCATING SYSTEMS AND METHODS; U.S. Pat. No. 10,845,497, issued Nov. 24, 2020, entitled PHASE-SYNCHRONIZED BURIED OBJECT TRANSMITTER AND LOCATOR METHODS AND APPARATUS; U.S. Pat. No. 10,859,727, issued Dec. 8, 2020, entitled ELECTRONIC MARKER DEVICES AND SYSTEMS; U.S. Pat. No. 10,908,311, issued Feb. 2, 2021, entitled SELF-STANDING MULTI-LEG ATTACHMENT DEVICES FOR USE WITH UTILITY LOCATORS; U.S. Pat. No. 10,928,538, issued Feb. 23, 2021, entitled KEYED CURRENT SIGNAL LOCATING SYSTEMS AND METHODS; U.S. Pat. No. 10,935,686, issued Mar. 2, 2021, entitled UTILITY LOCATING SYSTEM WITH MOBILE BASE STATION; and U.S. Pat. No. 10,955,583, issued Mar. 23, 2021, entitled BORING INSPECTION SYSTEMS AND METHODS. The content of each of the above-described patents and applications is incorporated by reference herein in its entirety. The content of each of the above-described patents and applications is incorporated by reference herein in its entirety. The above-described patent applications and patents may be referred to herein collectively as the "co-assigned applications" or "incorporated applications."

It is noted that as used herein, the term, "exemplary" means "serving as an example, instance, or illustration." Any aspect, detail, function, implementation, and/or embodiment described herein as "exemplary" is not necessarily to be construed as preferred or advantageous over other aspects and/or embodiments.

EXAMPLE EMBODIMENTS

Figure 1A:
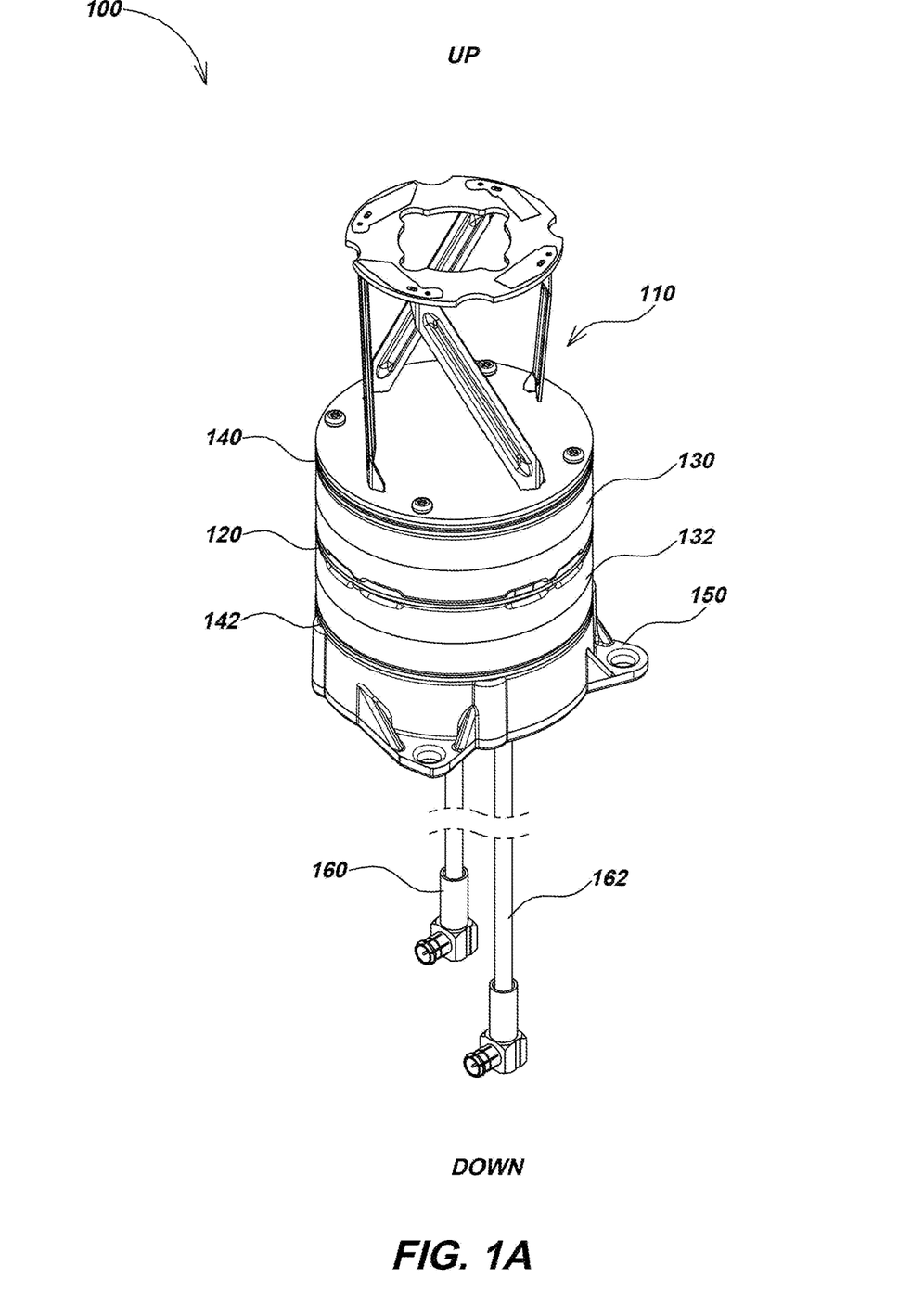
FIG. 1A is an isometric view of a combined satellite navigation radio transceiver antenna device.
Figure 1B:
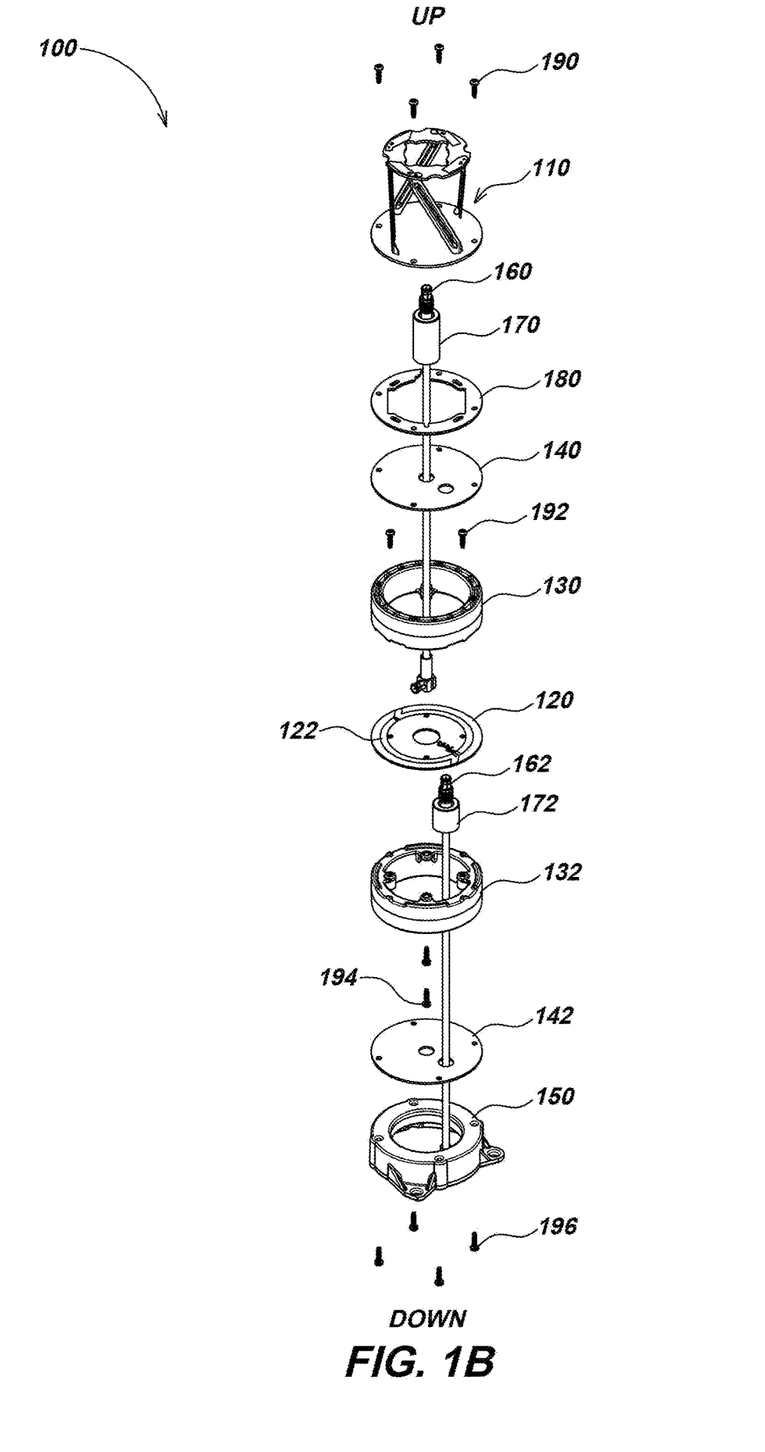
FIG. 1B is a top-down exploded view of the combined satellite navigation radio transceiver antenna device of FIG. 1A.
Figure 1C:
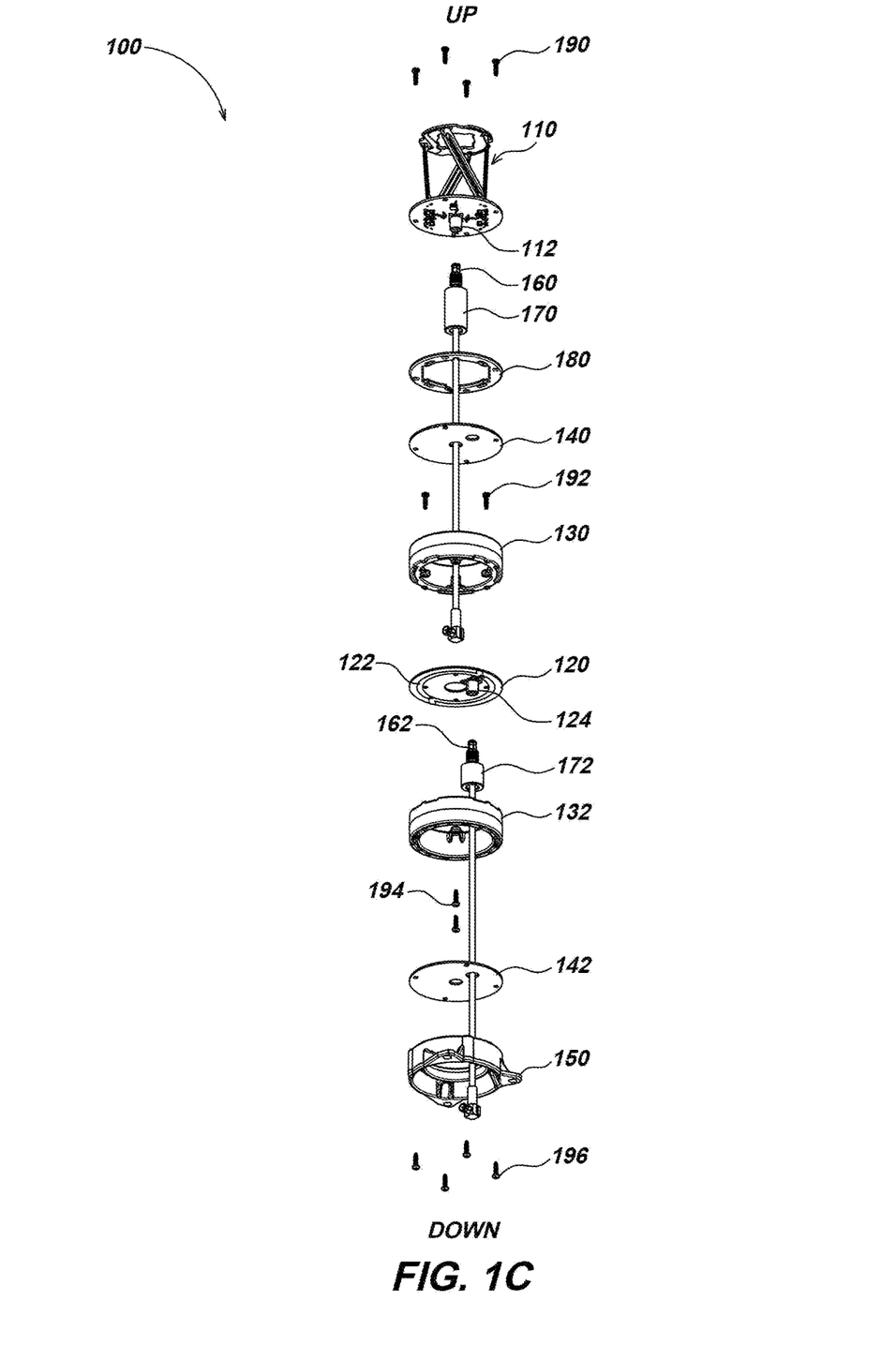
FIG. 1C is a bottom-up exploded view of the combined satellite navigation radio transceiver antenna device of FIG. 1A.

Referring to FIGS. 1A-1C, an exemplary embodiment of a combined satellite navigation radio transceiver antenna device 100 may include a GNSS antenna element 110. The GNSS antenna element 110 may be or include aspects of the various antennas disclosed in U.S. patent application Ser. No. 16/070,982, filed Oct. 11, 2017, entitled MULTIFUNCTIONAL GNSS ANTENNA, U.S. patent application Ser. No. 16/642,009, filed Oct. 11, 2017, entitled QUADRIFILAR HELICAL ANTENNA, U.S. patent application Ser. No. 15/831,335, filed Dec. 4, 2017, entitled PARASITIC MUTILFILAR MULTIBAND ANTENNA, U.S. patent application Ser. No. 16/622,047, filed Jul. 20, 2018, entitled ANTENNA MOUNTING BASE AND ANTENNA, U.S. Pat. No. 10,483,633, issued Nov. 19, 2019, entitled MULTIFUNCTIONAL GNSS ANTENNA, U.S. Pat. No. 10,700,430, issued Jun. 30, 2020, entitled PARASITIC MULTIFILAR MULTIBAND ANTENNA, and U.S. Pat. No. 11,050,131, issued Jun. 29, 2021, entitled ANTENNA MOUNTING BASE AND ANTENNA the contents of which are incorporated by reference herein in its entirety. Likewise, the GNSS antenna element 110 may be or include aspects of the various antennas disclosed in U.S. Provisional Patent Application No. 62/899,296, filed Sep. 12, 2019, entitled ANTENNA SYSTEMS FOR CIRCULARLY POLARIZED RADIO SIGNALS and U.S. patent application Ser. No. 17/020,487, filed Sep. 14, 2020, entitled ANTENNA SYSTEMS FOR CIRCULARLY POLARIZED RADIO SIGNALS the contents of which are incorporated by reference herein in its entirety. For instance, in some such antenna embodiments, which may be the GNSS antenna element 110, may have a top PCB and a ground plane PCB with an array of conductive antenna elements disposed in between the top PCB and ground plane PCB. The antenna elements may be positioned at relative zero, 90, 180, and 270 degree increments radially about a shared center point wherein each antenna element may slope upward in a left-handed direction connecting from the ground plane PCB and top PCB. The GNSS antenna element 110 may, in some embodiments which may be or share aspects with the antenna elements of the incorporated application, be configured for a frequency range spanning the lower L-band and upper L-band GNSS navigational frequencies which includes the L1, L2, and L5 GNSS navigational frequencies. It should be noted that during intended usage, the combined satellite navigation radio transceiver antenna device 100 may be oriented with the GNSS antenna element 110 directed up toward the sky and thereby navigation satellites.

The combined satellite navigation radio transceiver antenna device 100 may further include a radio transceiver antenna element 122 (FIGS. 1B and 1C) which may be disposed on a PCB 120. The radio transceiver antenna element 122 (FIGS. 1B and 1C) may be one or more traces or like electromagnetic material disposed on PCB 120 that may be utilized in sending and receiving radio signals (e.g., Bluetooth, WLAN, WiFi, or like radio signals). The PCB 120, and radio transceiver antenna element 122 (FIGS. 1B and 1C) disposed thereon, may be physically separated from the GNSS antenna element 110 via a spacing element 130. Likewise, an additional spacing element 132 may be positioned on the opposite face of the PCB 120 adding a physical separation between the radio transceiver antenna element 122 (FIGS. 1B and 1C) on PCB 120 and a device in which the combined satellite navigation radio transceiver antenna device 100 may be employed. A shielding element 140 may be disposed between the spacing element 130 and GNSS antenna element 110 and an additional shielding element 142 may be disposed between the spacing element 132 and a mounting bracket 150.

As illustrated in FIGS. 1A-1C, the GNSS antenna element 110 and radio transceiver antenna element 122 (FIGS. 1B and 1C) may be substantially cylindrical in shape each having vertical axes that may be substantially collinear in assembly. The GNSS antenna element 110 may be positioned atop the of radio transceiver antenna element 122 (FIGS. 1B and 1C) orienting the GNSS antenna element 110 towards the sky during normal usage. The diameter of radio transceiver antenna element 122 (FIGS. 1B and 1C) may substantially match the diameter of the GNSS antenna element 110. The GNSS antenna element may be positioned atop the of radio transceiver antenna element orienting the GNSS antenna element towards the sky during normal usage. Further the radio transceiver antenna element 122 (FIGS. 1B and 1C) may have a height measuring less than two times the height of the GNSS antenna element 110. It should be noted that GNSS antenna element 110 and radio transceiver antenna element 122 (FIGS. 1B and 1C) may be modular allowing for exchanging out of antenna elements and/or utilization of commercially available antennas.

Figure 2:
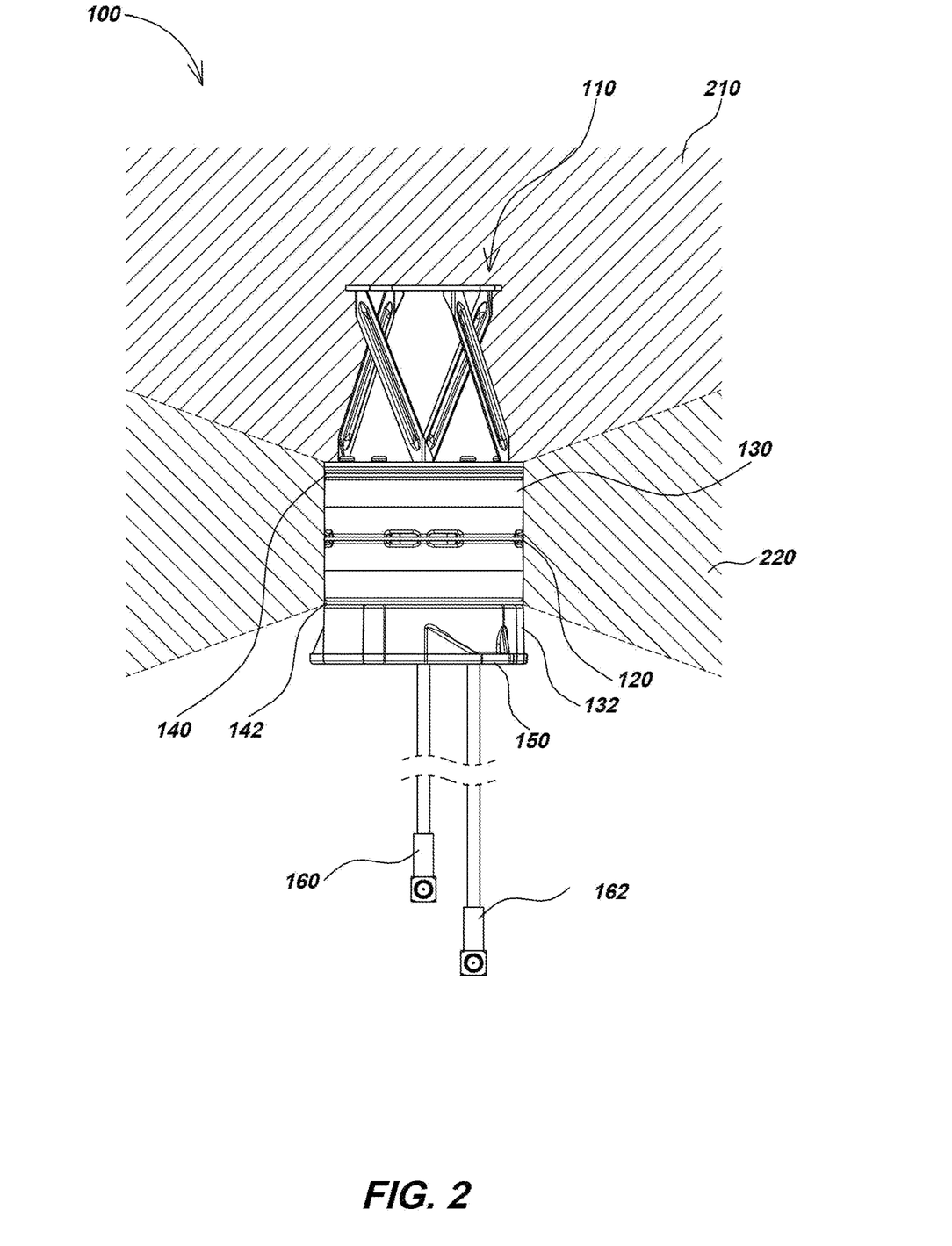
FIG. 2 is a side view of the combined satellite navigation radio transceiver antenna device of FIG. 1A.

Turning to FIG. 2, the shielding elements 140 and 142 may aid in directing the field of a signal or signals, such as signal 220, transmitted from radio transceiver antenna element 122 (FIGS. 1B and 1C) disposed on PCB 120. The signal 220 and/or other signal or signals from a radio transceiver element of the present disclosure may be directed so as to prevent the signal or signals from coupling at the GNSS antenna element 110 and/or otherwise interfering with navigation signals, such as signals 210, received at the GNSS antenna element 110. Likewise, a signal or signals, such as signal 220, broadcasted from radio transceiver antenna element 122 (FIGS. 1B and 1C) disposed on PCB 120, may otherwise be shaped via a waveguide element (e.g., waveguide elements 126 of FIG. 3) to steer the radiation pattern of a transmitted signal in such a way to prevent coupling back at the GNSS antenna element 110.

Figure 3:
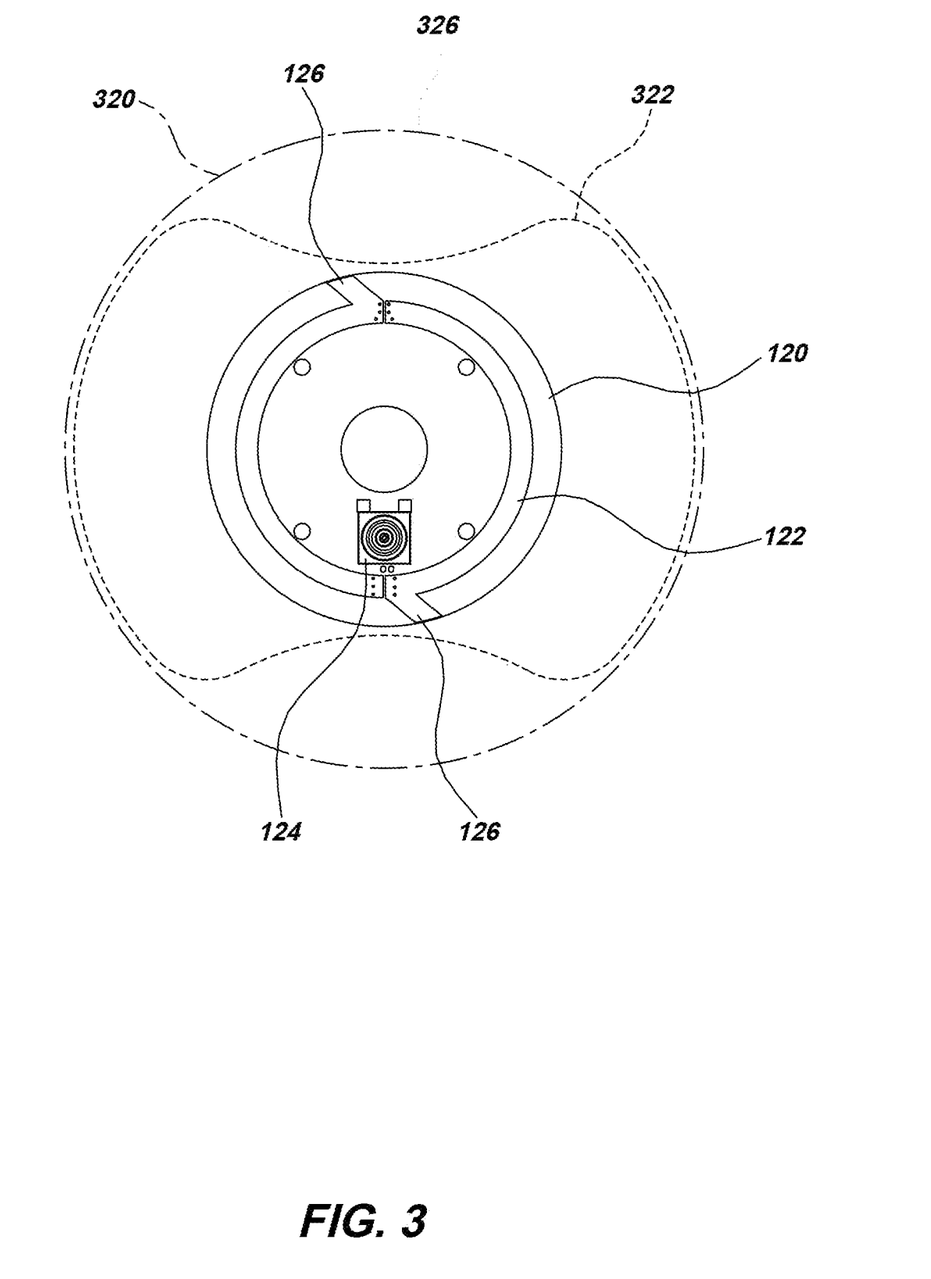
FIG. 3 is a detailed top view of the PCB of the combined satellite navigation radio transceiver antenna device of FIG. 1A.

As illustrated in FIG. 3, a waveguide element such as the waveguide elements 126 on radio transceiver antenna element 122 may be used to shape the signals (e.g., combined transmitted signal 320) of radiation patterns transmitted therefrom. On PCB 120, the waveguide elements 126 may be additional portions one or more traces or like electromagnetic material angled outward from the radio transceiver antenna element 122 towards the edge of PCB 120. The combined transmitted signal 320 broadcast via the radio transceiver antenna element 122 having waveguide elements 126 may have a largely circular horizontal cross-section such that any transmitted signal 320 incidentally coupled back at the GNSS antenna element 110 (FIGS. 1A-1C) may do so in equal measure. For instance, without the waveguide elements 126, the radio transceiver antenna element 122 may transmit a signal having horizontal cross-section shape of that illustrated with signal 322. The waveguide elements 126 may provide a signal having horizontal cross-section shape of that illustrated with signal 326 such that the combination of signals 322 and 326 may result in signal 320 having a largely circular horizontal cross-section. Signal 322 may provide signal in different measure at the GNSS antenna element 110 (FIGS. 1A-1C), such as at the various conductive antenna elements positioned at a relative zero, 90, 180, and 270 degrees of the GNSS antenna element 110 (FIGS. 1A-1C), without the addition of signal 326.

Figure 4:
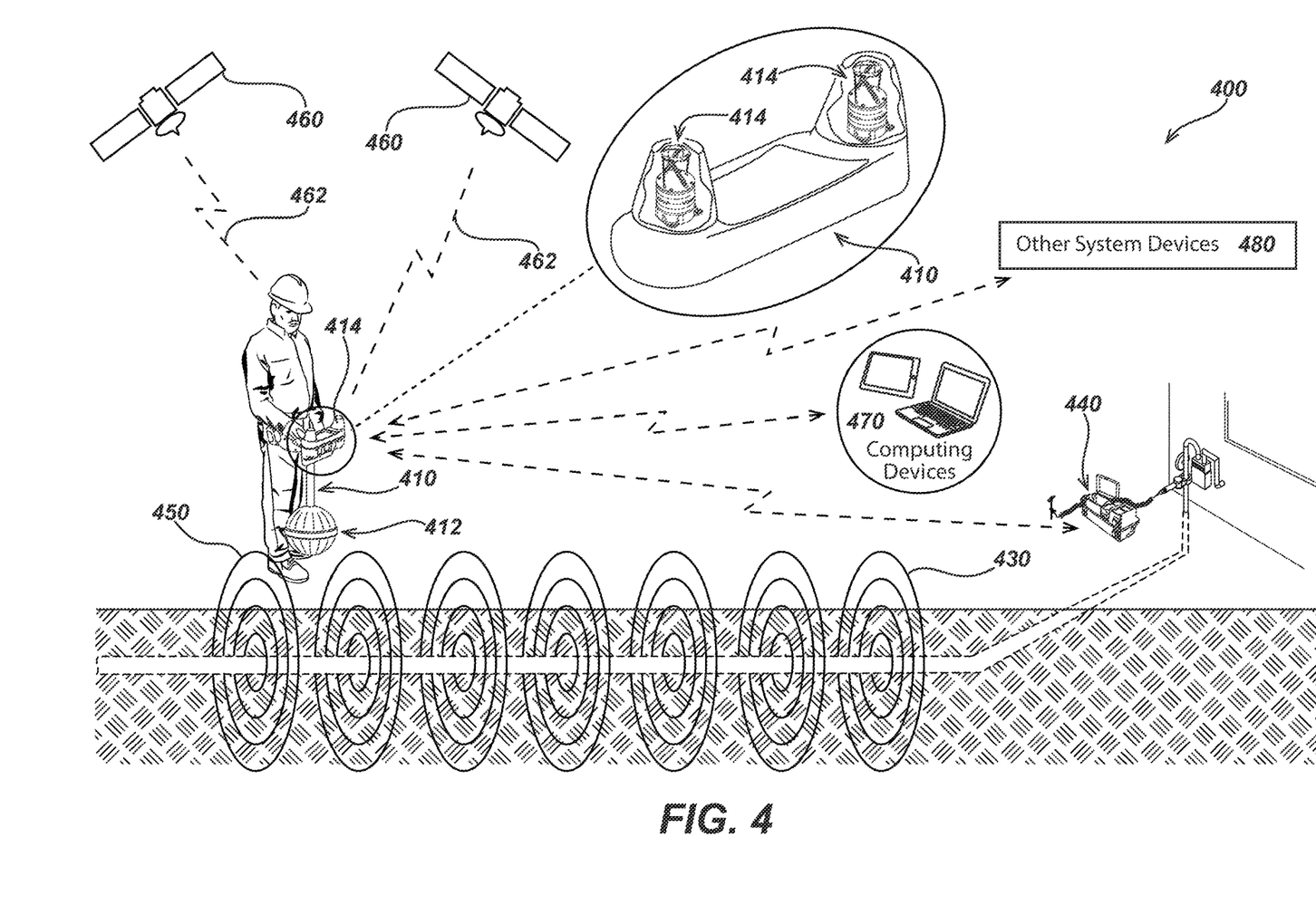
FIG. 4 is an illustration of a utility locating system including a utility locator device having a combined satellite navigation radio transceiver antenna device in keeping with the present disclosure.

Referring back to FIGS. 1A-1C, the mounting bracket 150 may allow the combined satellite navigation radio transceiver antenna device 100 to be mounted to a device employing the combined satellite navigation radio transceiver antenna device 100 (e.g., utility locator device 410 of FIG. 4). In other embodiments, other mounting brackets or other ways of mounting and securing a combined satellite navigation radio transceiver antenna device in place.

The combined satellite navigation radio transceiver antenna device 100 may further include separate connectors, such as connectors 160 and 162. The connectors 160 and 162 may allow the various antenna elements, such as GNSS antenna element 110 and the radio transceiver antenna element 122 (FIGS. 1B and 1C) disposed on a PCB 120, to communicate associated signals to separate radio devices. For instance, the connector 160 coupled to the GNSS antenna element 110 (FIGS. 1A-1C) may communicate signals with one or more GNSS modules and the connector 162 coupled to the radio transceiver antenna element 122 (FIGS. 1B-1C) may communicate signals with one or more radio modules (e.g., Bluetooth, WiFi, WLAN, or like radio transceiver, receiver, or transmitter modules). Each radio device (GNSS receiver module or modules and the Bluetooth, WiFi, WLAN, or like radio transceiver, receiver, or transmitter modules) may further be disposed in a device (e.g., utility locator device 410 of FIG. 4) in which the combined satellite navigation radio transceiver antenna device 100 may be employed.

As illustrated in FIGS. 1B and 1C, the connector 160 may connect to a terminal 112 (FIG. 1C) on GNSS antenna element 110 providing a connection for transmitting signals between the GNSS antenna element 110 and an employing device. Likewise, the connector 162 may connect to a terminal 124 (FIG. 1C) on PCB 120 providing a connection for transmitting signals between the radio transceiver antenna element 122 and other components disposed on PCB 120 and the employing device that the combined satellite navigation radio transceiver antenna device 100 may be disposed in. The combined satellite navigation radio transceiver antenna device 100 may further include a hollow cylindrical connector cover 170 and 172 comprising of ferrite or like ferromagnetic materials that may be positioned to encapsulate a portion of connectors 160 and 162 passing through the combined satellite navigation radio transceiver antenna device 100 towards a device (e.g., utility locator device 410 of FIG. 4) employing the combined satellite navigation radio transceiver antenna device 100. In use, the connector covers 170 and 172 may prevent interference between signals communicating between the GNSS antenna element 110 as well as PCB 120 and a device employing the combined satellite navigation radio transceiver antenna device 100 with interfering with navigation signals received at the GNSS antenna element 110 and signals broadcast or received at the radio transceiver antenna element 122.

Still referring to FIGS. 1B and 1C, an alignment element 180 may be disposed between GNSS antenna element 110 and shielding element 140. The alignment element 180 may, in assembly, provide for correct alignment in mounting the GNSS antenna element 110. A variety of screws (such as screws 190, 192, 194, or 196), adhesives, or other like fasteners or fastening techniques or materials may be used to secure the various combined satellite navigation radio transceiver antenna device 100 together.

Referring to FIGS. 1A-1C, GNSS, Bluetooth, WiFi, or other radio modules configured to receive and/or generate radio signals may be disposed in a device (e.g., utility locator device 410 of FIG. 4 or like device) employing the combined satellite navigation radio transceiver antenna device 100 communicated to the combined satellite navigation radio transceiver antenna device 100 via connectors 160 and 162. In some embodiments, the PCB 120 and/or a PCB located on the GNSS antenna element 110 and/or other location may further include GNSS, Bluetooth, WiFi, or other radio modules configured to process radio signals received at the GNSS antenna element 110 and/or radio transceiver antenna element 122 (FIGS. 1B and 1C) and/or generate radio signals for transmission via the radio transceiver antenna element 122 (FIGS. 1B and 1C).

A combined satellite navigation radio transceiver antenna device in keeping with the present disclosure, which may be or share aspects with the combined satellite navigation radio transceiver antenna device 100 of FIGS. 1A-3, may be used in utility locator devices and associated utility locating systems and devices. In FIG. 4, a utility locating system 400 is illustrated having a utility locator device 410 held by a user 420. The utility locator device 410 may have an antenna array 412 located on the end closest to the ground surface for sensing and measuring magnetic fields associated with one or more utility lines such as utility line 430. For instance, a transmitter device 440 may be configured to couple an electromagnetic signal onto utility line 430. The utility line 430 may emit one or more signals such as signal 450 that may be received at antenna array 412 of utility locator device 410 to determine the position of the utility line 430 which may be buried beneath the Earth's surface. On the end opposite that of the antenna array 412, the utility locator device 410 may include one or more combined satellite navigation radio transceiver antenna device in keeping with the present disclosure such as the combined satellite navigation radio transceiver antenna devices 414. Each combined satellite navigation radio transceiver antenna device 414 may include both a GNSS antenna element to receive navigation signals 462 from navigation satellites 460 as well as communicate to other devices via a radio transceiver antenna element configured for communication via Bluetooth, WiFi or other WLAN, and/or like associated radios. For instance, each radio transceiver antenna element of each combined satellite navigation radio transceiver antenna device 414 may communicate via wireless signals to the transmitter device 440, computing devices 470 (e.g., laptops, smart phones, personal computers, cloud computers, and/or the like), and other system devices 480 (e.g., other utility locator devices, additional transmitter devices, base stations, camera control units or drums or like pipe inspection equipment or systems, or similar systems or devices that may be used in a utility locating system).

In one or more exemplary embodiments, the electronic functions, methods and processes described herein and associated with transmitters and locators may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

As used herein, computer program products comprising computer-readable media including all forms of computer-readable medium except, to the extent that such media is deemed to be non-statutory, transitory propagating signals.

It is understood that the specific order or hierarchy of steps or stages in the processes and methods disclosed herein are examples of exemplary approaches. Based upon design preferences, it is understood that the specific order or hierarchy of steps in the processes may be rearranged while remaining within the scope of the present disclosure unless noted otherwise.

Those of skill in the art would understand that information and signals, such as video and/or audio signals or data, control signals, or other signals or data may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, electro-mechanical components, or combinations thereof. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative functions and circuits described in connection with the embodiments disclosed herein with respect to camera and lighting elements may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps or stages of a method, process or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed embodiments is provided to enable any person skilled in the art to make or use the present disclosure. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

The disclosure is not intended to be limited to the aspects shown herein, but is to be accorded the full scope consistent with the specification and drawings, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c.

The previous description of the disclosed aspects is provided to enable any person skilled in the art to make or use embodiments of aspects of the disclosure. Various modifications to these aspects will be readily apparent to those skilled in the art, and the generic principles defined herein may be applied to other aspects without departing from the spirit or scope of the disclosure. Thus, the presently claimed invention is not intended to be limited to the aspects shown herein, but is to be accorded the widest scope consistent with the following claims and their equivalents.

We claim:

1. A combined satellite navigation radio transceiver antenna device, comprising:
   a substantially cylindrical global navigation system sensor (GNSS) antenna element having a vertical axis;
   a substantially cylindrical radio transceiver antenna element positioned below the GNSS antenna element when in an upright vertical orientation, wherein:
   the diameter of the radio transceiver antenna element is substantially the same as the diameter of the GNSS antenna element;
   the vertical axes of the two antenna elements are substantially collinear; and
   the height of the radio transceiver antenna element is less than about twice the height of the GNSS antenna element;

one or more spacing elements disposed between the radio transceiver antenna element and GNSS antenna element and between the radio transceiver antenna element and one or more other electronic elements in an electronic device or system operatively coupled to the combined satellite navigation radio transceiver antenna device;
a shielding element disposed on the side of the spacing element or elements opposite that the radio transceiver antenna element; and
connectors separately coupling to each of the antenna elements such that each antenna element is operatively coupled to an associated signal or signals provided to separate radio devices of the electronic device or system.

2. The device of claim 1, further including a waveguide element configured to control the radiation pattern of signals transmitted from the antenna elements.

3. The device of claim 2, wherein the waveguide element is disposed on a PCB.

4. The device of claim 3, wherein the radio transceiver antenna element is also disposed on a PCB.

5. The device of claim 1, wherein the radio transceiver antenna element is disposed on a PCB.

6. The device of claim 1, wherein the radio transceiver antenna element is configured to receive and/or broadcast WiFi or other wireless local area networking (WLAN) signals.

7. The device of claim 1, wherein the radio transceiver antenna element is configured to receive and/or broadcast Bluetooth signals.

8. The device of claim 7, wherein the radio transceiver antenna element is further configured to receive and/or broadcast WiFi or other WLAN signals.

9. The device of claim 1, further comprising one or more GNSS receiver modules operatively coupled to the GNSS antenna element, wherein the GNSS receiver module or modules provide positioning output data from one or more outputs.

10. The device of claim 9, wherein the GNSS receiver modules are configured to operate in a frequency range spanning the lower L-band and upper L-band GNSS navigational frequencies.

11. The device of claim 1, further including one or more hollow cylindrical connector covers comprised of ferrite or similar ferromagnetic materials encapsulating a portion of the one or more connectors disposed on one or more of the antenna devices.

12. The device of claim 1, wherein one or more of the antenna elements are configured to be modular and detachable to allow for field interchange of antenna elements.

13. A buried utility locator system, comprising:
a magnetic sensing buried utility locator for receiving and processing AC magnetic field signals from a hidden or buried utility and determining information about the buried utility therefrom;
a substantially cylindrical global navigation system sensor (GNSS) antenna element having a vertical axis;
a substantially cylindrical radio transceiver antenna element positioned below the GNSS antenna element when in an upright vertical orientation, wherein:
the diameter of the radio transceiver antenna element is substantially the same as the diameter of the GNSS antenna element;
the vertical axes of the two antenna elements are substantially collinear; and
the height of the radio transceiver antenna element is less than about twice the height of the GNSS antenna element;
a waveguide element configured to control the radiation pattern of signals transmitted from the antenna elements;
one or more spacing elements disposed between the radio transceiver antenna element and GNSS antenna element and between the radio transceiver antenna element and one or more other electronic elements in an electronic device or system operatively coupled to the combined satellite navigation radio transceiver antenna device;
a shielding element disposed on the side of the spacing element or elements opposite that the radio transceiver antenna element;
connectors separately coupling to each of the antenna elements such that each antenna element is operatively coupled to an associated signal or signals provided to separate radio devices of the electronic device or system;
one or more GNSS receiver modules operatively coupled to the GNSS antenna element; and
electronics to receive and associate the information about the buried utility and positioning information from the GNSS receiver module and store the information in a non-transitory memory.

14. The system of claim 13, wherein the waveguide element and the radio transceiver elements are disposed on a PCB.

15. The system of claim 13, wherein the radio transceiver antenna element is configured to receive and/or broadcast WiFi or other wireless local area networking (WLAN) signals.

16. The system of claim 13, wherein the radio transceiver antenna element is configured to receive and/or broadcast Bluetooth signals.

17. The system of claim 16, wherein the radio transceiver antenna element is further configured to receive and/or broadcast WiFi or other WLAN signals.

18. The system of claim 13, wherein the GNSS receiver modules are configured to operate in a frequency range spanning the lower L-band and upper L-band GNSS navigational frequencies.

19. The system of claim 13, further including one or more hollow cylindrical connector covers comprised of ferrite or similar ferromagnetic materials encapsulating a portion of the one or more connectors disposed in the antenna device.

20. The system of claim 13, wherein the antenna elements are configured to be modular and detachable to allow for field interchange of antenna elements.

21. A combined satellite navigation radio transceiver antenna device, comprising:
a global navigation system sensor (GNSS) antenna element having a vertical axis;
a radio transceiver antenna element positioned below the GNSS antenna element when in an upright vertical orientation, wherein:
vertical axes of the two antenna elements are substantially collinear; and
the height of the radio transceiver antenna element is less than twice the height of the GNSS antenna element;
a waveguide element configured to control the radiation pattern signals transmitted from the antenna elements;
one or more spacing elements disposed between the radio transceiver antenna element and GNSS antenna element and between the radio transceiver antenna element and one or more other electronic elements in an electronic device or system operatively coupled to the combined satellite navigation radio transceiver antenna device;

a shielding element disposed on the side of the spacing element or elements opposite that the radio transceiver antenna element; and connectors separately coupling to each of the antenna elements such that each antenna element is operatively coupled to an associated signal or signals provided to separate radio devices of the electronic device or system.

\* \* \* \* \*